(12) United States Patent
Ido et al.

(10) Patent No.: US 12,728,377 B2
(45) Date of Patent: Sep. 8, 2026

(54) HONEYCOMB STRUCTURE

(71) Applicant: NGK INSULATORS, LTD., Nagoya-City (JP)

(72) Inventors: Yuya Ido, Nagoya-City (JP); Shogo Hirose, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 131 days.

(21) Appl. No.: 18/451,190

(22) Filed: Aug. 17, 2023

(65) Prior Publication Data

US 2023/0390752 A1 Dec. 7, 2023

Related U.S. Application Data

(63) Continuation of application No. PCT/JP2022/013413, filed on Mar. 23, 2022.

(30) Foreign Application Priority Data

Mar. 31, 2021 (WO) .................. PCT/JP2021/013794

(51) Int. Cl.
*F01N 3/28* (2006.01)
*B01D 46/24* (2006.01)
(Continued)

(52) U.S. Cl.
CPC ..... *B01D 46/2484* (2021.08); *B01D 46/2455* (2013.01); *B01D 46/247* (2013.01);
(Continued)

(58) Field of Classification Search
CPC ..................................................... F01N 3/2828
See application file for complete search history.

(56) References Cited

U.S. PATENT DOCUMENTS 6,159,431 A 12/2000 Inoue et al.
2010/0160158 A1* 6/2010 Ando ................ B01D 46/2484 502/439
(Continued)

FOREIGN PATENT DOCUMENTS

EP 1 384 508 A1 1/2004
JP H10-264125 A 10/1998
(Continued)

OTHER PUBLICATIONS

International Search Report and Written Opinion (Application No. PCT/JP2022/013413) dated Jun. 7, 2022 (9 pages).
(Continued)

*Primary Examiner* — Humera N. Sheikh
*Assistant Examiner* — Julia L Rummel
(74) *Attorney, Agent, or Firm* — Muncy, Geissler, Olds & Lowe, P.C.

(57) ABSTRACT

A honeycomb structure includes a pillar-shaped honeycomb structure body having a porous partition wall and a circumferential wall, wherein in a section orthogonal to the extending direction of the cells of the honeycomb structure body, the shape of the cell is a polygonal shape with a corner having an arc shape, a thickness T1[mm] of the partition wall is 0.0500 to 0.1400 mm, a radius of curvature R1[mm] of the corner having the arc shape of the cell and the thickness T1[mm] of the partition wall satisfy the relationship of Equation (1), in the section orthogonal to the extending direction of the cells of the honeycomb structure body, the outer diameter of the honeycomb structure body is 190.5 to 355.6 mm, and a porosity of the partition wall is 20 to 40%.

$$0.0050 \leq R1 \times T1 \leq 0.0150 \quad \text{Equation (1):}$$

2 Claims, 3 Drawing Sheets

(51) Int. Cl.
*B01D 53/94* (2006.01)
*B01J 35/57* (2024.01)
*B01J 35/40* (2024.01)

(52) U.S. Cl.
CPC ..... *B01D 46/2474* (2013.01); *B01D 46/2482* (2021.08); *B01D 46/249* (2021.08); *B01D 46/2498* (2021.08); *B01D 53/94* (2013.01); *B01J 35/57* (2024.01); *F01N 3/2828* (2013.01); *B01D 2255/9155* (2013.01); *B01D 2258/01* (2013.01); *B01J 35/40* (2024.01); *F01N 2330/06* (2013.01); *F01N 2330/34* (2013.01); *F01N 2330/48* (2013.01)

(56) References Cited

U.S. PATENT DOCUMENTS

2013/0059724 A1 3/2013 Hirose et al.
2013/0136663 A1 5/2013 Bubb et al.
2015/0275726 A1* 10/2015 Tamai ................ B01D 46/2482 428/116
2019/0291091 A1* 9/2019 Yamamoto ............... B01J 23/02

FOREIGN PATENT DOCUMENTS

| | | | |
|---|---|---|---|
| JP | 2002-046117 | A | 2/2002 |
| JP | 2008-246472 | A | 10/2008 |
| JP | 2013-052367 | A | 3/2013 |
| JP | 2014-046601 | A | 3/2014 |
| JP | 2015-500140 | A | 1/2015 |
| JP | 2019-166484 | A | 10/2019 |

OTHER PUBLICATIONS

German Office Action for German Application No. 11 2022 000 961.6 dated Mar. 26, 2026.

* cited by examiner

HONEYCOMB STRUCTURE

TECHNICAL FIELD

The present invention relates to a honeycomb structure. More specifically, the present invention relates to a honeycomb structure having high isostatic strength and capable of achieving pressure loss reduction.

BACKGROUND ART

In recent years, there has been an increasing awareness of environmental issues throughout society. In the technical field of generating power by combusting fuel, various techniques for removing harmful components such as nitrogen oxides (hereinafter, also referred to as "NOx") from exhaust gas generated in combustion of fuel have been developed. For example, various techniques for removing harmful components such as NOx from exhaust gas emitted from diesel-powered vehicles have been developed. When removing the harmful components in exhaust gas, it is common to use catalysts to cause chemical reaction in the harmful components to convert them into other components that are relatively harmless. Then, a honeycomb structure is used as a catalyst carrier for loading catalysts for purifying exhaust gas (see, for example, Patent Document 1).

For example, various techniques for treating NOx in exhaust gas have been proposed for NOx regulations described above. For example, as one of such techniques, there is a technique in which a honeycomb structure having a porous partition wall is loaded with a selective catalytic reduction catalyst (hereinafter, also referred to as a "SCR catalyst") or the like, and NOx in exhaust gas is purified by the honeycomb structure. The honeycomb structure loaded with SCR catalyst reduces NOx in exhaust gas using ammonia ($NH_3$) generated by decomposition of urea injected from an urea injector disposed upstream of the honeycomb structure.

CITATION LIST

Patent Documents

[Patent Document 1] JP-A-2013-052367

Conventionally, when a honeycomb structure loaded with SCR catalyst is used as an exhaust gas purification device for removing NOx from exhaust gas emitted from an engine of a diesel vehicle, two honeycomb structures may be used by arranging them in series with respect to the flow direction of exhaust gas. Although high purification performance for NOx can be achieved by using them in this way, on the other hand, there is a problem that pressure loss increases.

As a method of reducing pressure loss of the honeycomb structure, for example, a technique of "thinning wall" for thinning a thickness of the partition wall of the honeycomb structure has been studied, but with the thinning wall of the partition wall, there is a problem that a distortion is generated in the partition wall at the time of manufacturing and thus cells are collapsed (hereinafter, also referred to as "cell twisting"). In addition, a technique for improving isostatic strength of the honeycomb structure by forming a cell shape of a honeycomb structure body into a polygonal shape with a corner having an arc shape has also been studied. However, when the cell shape is a polygonal shape with a corner having an arc shape, pressure loss of the honeycomb structure increases. As described above, in various techniques which have been studied in the related art, the reduction in pressure loss and the improvement of the isostatic strength are contrary to each other, and it is extremely difficult to achieve both of them.

The present invention has been made in view of the problems with the prior arts described above. The present invention provides a honeycomb structure having high isostatic strength even when the outer diameter is large and capable of achieving pressure loss reduction.

Means for Solving the Problem

According to the present invention, there is provided a honeycomb structure to be described below.

[1] A honeycomb structure including: a pillar-shaped honeycomb structure body having a porous partition wall disposed so as to surround a plurality of cells which serve as fluid through channels extending from a first end face to a second end face; and a circumferential wall disposed so as to encompass the partition wall, wherein in a section orthogonal to the extending direction of the cells of the honeycomb structure body, the shape of the cell is a polygonal shape with a corner having an arc shape, a thickness T1[mm] of the partition wall is 0.0500 to 0.1400 mm, a radius of curvature R1[mm] of the corner having the arc shape of the cell and the thickness T1[mm] of the partition wall satisfy the relationship of Equation (1), in the section orthogonal to the extending direction of the cells of the honeycomb structure body, an outer diameter of the honeycomb structure body is 190.5 to 355.6 mm, and a porosity of the partition wall is 20 to 40%.

$$0.0050 \le R1 \times T1 \le 0.0150 \text{ Equation (1):}$$

[2] The honeycomb structure according to [1], wherein, in the section orthogonal to the extending direction of the cells of the honeycomb structure body, the shape of the cell is a quadrangular shape with the corner having the arc shape.

[3] The honeycomb structure according to [1] or [2], wherein a cell density of the honeycomb structure body is 30 to 140 cells/cm$^2$.

The honeycomb structure of the present invention has high isostatic strength even when the outer diameter is large and capable of achieving pressure loss reduction.

MODE FOR CARRYING OUT THE INVENTION

Hereinafter, embodiments of the present invention will be described. However, the present invention is not limited to the following embodiments. Therefore, it should be understood that modifications, improvements, and the like may be appropriately added to the following embodiments without departing from the spirit of the present invention based on the ordinary knowledge of those skilled in the art.

Figure 1:
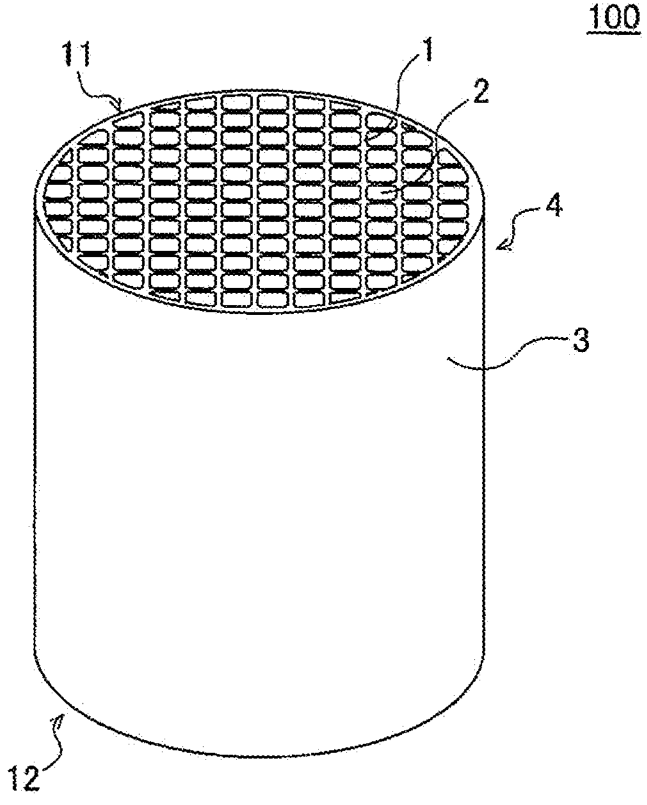
FIG. 1 is a perspective view schematically showing one embodiment of a honeycomb structure according to the present invention as viewed from a first end face side.
Figure 2:
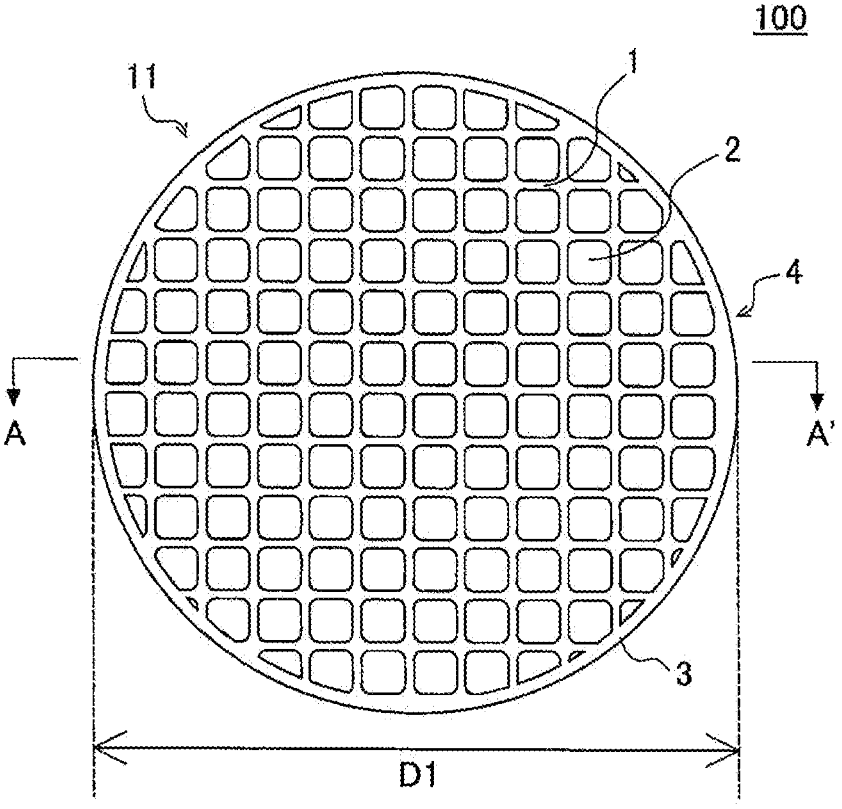
FIG. 2 is a plan view schematically showing a first end face of the honeycomb structure shown in FIG. 1.
Figure 3:
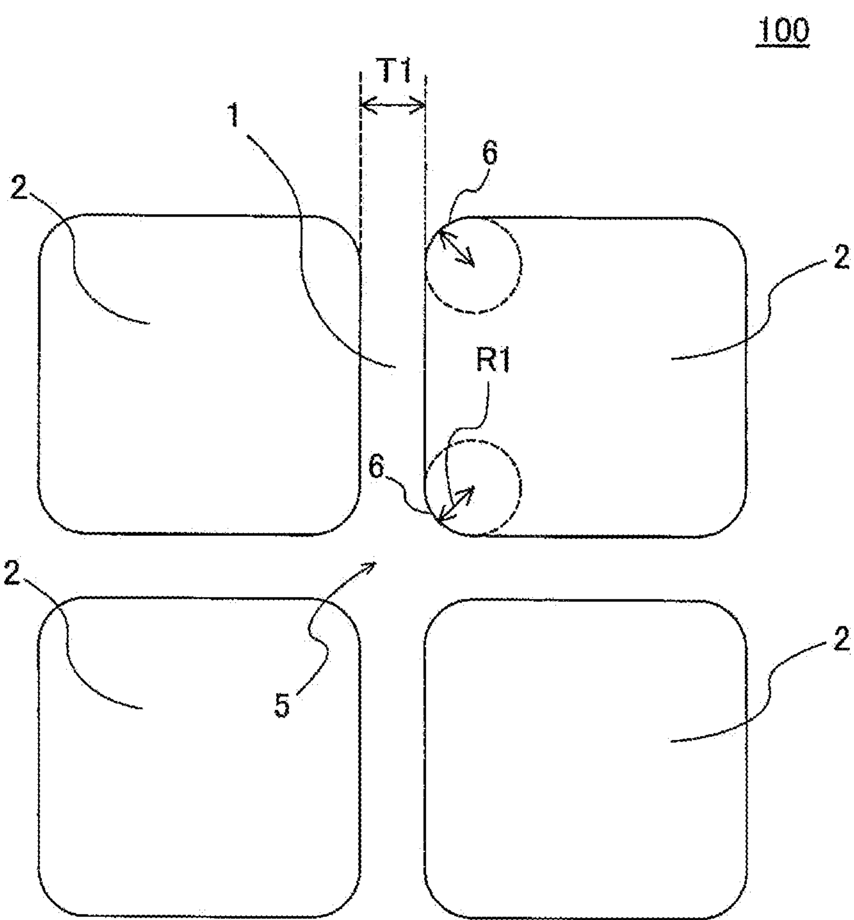
FIG. 3 is an enlarged schematic plan view schematically showing a part of a first end face of the honeycomb structure shown in FIG. 2.
Figure 4:
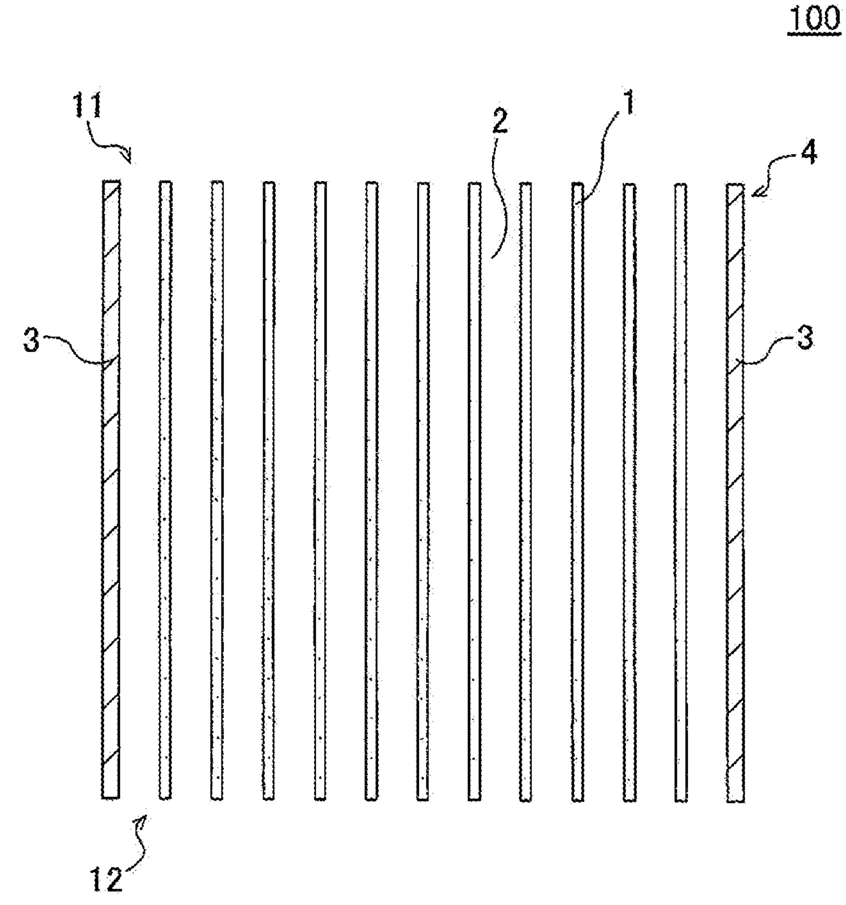
FIG. 4 is a sectional view schematically showing a section taken along the line A-A' of FIG. 2.

(1) Honeycomb Structure:

Referring to FIGS. 1 to 4, one embodiment of the honeycomb structure of the present invention will be described. One embodiment of the honeycomb structure of the present invention is a honeycomb structure 100 including a pillar-shaped honeycomb structure body 4 having a porous partition wall 1 disposed so as to surround a plurality of cells 2 and a circumferential wall 3 disposed so as to encompass the partition wall 1. Here, FIG. 1 is a perspective view schematically showing one embodiment of a honeycomb structure of the present invention as viewed from a first end face side. FIG. 2 is a plan view schematically showing a first end face of the honeycomb structure shown in FIG. 1. FIG. 3 is an enlarged schematic plan view schematically showing a part of a first end face of the honeycomb structure shown in FIG. 2. FIG. 4 is a sectional view schematically showing a section taken along the line A-A' of FIG. 2.

The porous partition wall 1 constituting the honeycomb structure body 4 is disposed so as to surround the plurality of cells 2 extending from the first end face 11 to the second end face 12. In the present invention, the cell 2 means a space defined by the partition wall 1. The plurality of cells 2 serve as fluid through channels. The circumferential wall 3 is disposed so as to encompass the partition wall 1 arranged in a grid pattern so as to surround the plurality of cells 2. The honeycomb structure 100 can be suitably used as a catalyst carrier for loading a catalyst for exhaust gas purification. A catalyst carrier is a porous structure that supports catalytic particulates.

In the honeycomb structure 100 of the present embodiment, in a section orthogonal to the extending direction of the cell 2 of the honeycomb structure body 4, the shape of the cell 2 is a polygonal shape with a corner 6 having an arc shape. In particular, in the honeycomb structure 100 of the present embodiment, as shown in FIG. 4, the shape of the cell 2 is a quadrangular shape with a corner 6 having an arc shape. Hereinafter, the "polygonal shape with a corner 6 having an arc shape may be referred to as a "substantially polygonal shape", and the "quadrangular shape with a corner 6 having an arc shape" may be referred to as a "substantially quadrangular shape". For example, in a section orthogonal to the extending direction of the cells 2 of the honeycomb structure body 4, a plurality of cells 2 are arranged in a square grid pattern along a first direction in the section (for example, a vertical direction of a paper surface) and a second direction orthogonal to the first direction (for example, a lateral direction of a paper surface). The intersection part 5 of the square grid is formed by each corner 6 having an arc shape of the four cells 2 arranged in the square grid pattern. As described above, the cell 2 means a space surrounded by the partition wall 1. Therefore, having a corner 6 having an arc shape with respect to the shape of the cell 2 means that a part of the space of the cell 2 that is the corner of the quadrangular shape is occupied by the partition wall 1 surrounding the cell 2.

In the honeycomb structure 100, a thickness T1[mm] of the partition wall 1 is 0.0500 mm or more. The thickness of the partition wall 1 is the length in the direction orthogonal to the surface of the partition wall 1 defining two cells 2 in a section of the honeycomb structure body 4. Here, the "partition wall 1 defining two cells 2" in measuring the thickness of the partition wall 1 does not include the thickness of the partition wall 1 corresponding to the part constituting a corner 6 having an arc shape of the cell 2. That is, as described above, the "thickness of the partition wall 1" does not include the thickness of the intersection part 5 of the partition wall 1, and is defined as the thickness of the partition wall 1 of the part defining four sides constituting the main outline of the cell 2 having a substantially quadrangular shape, unless otherwise specified. The thickness of the partition wall 1 can be measured, for example, using a microscope.

The thickness T1[mm] of the partition wall 1 may be 0.0500 to 0.1400 mm, and is preferably, for example, 0.0630 to 0.1400 mm, more preferably 0.0635 to 0.0889 mm (i.e., 63.5 to 88.9 μm). When the thickness T1[mm] of the partition wall 1 is less than 0.0500 mm, the intersection part 5 in the partition wall 1 becomes too large, kneaded material for forming is concentrated at the intersection part 5 at the time of manufacturing, and the partition wall 1 other than the intersection part 5 tends to be poorly formed, when the relationship of the following equation (1) is satisfied. When the partition wall 1 is poorly formed in this way, the isostatic strength is significantly reduced. In addition, when the thickness T1[mm] of the partition wall 1 is less than 0.0500 mm, deformation is generated in the partition wall 1 at the time of manufacturing, and the cell twisting is more likely to occur. On the other hand, when the thickness T1[mm] of the partition wall 1 exceeds 0.1400 mm, pressure loss of the honeycomb structure 100 increases.

In addition, in the honeycomb structure 100, the radius of curvature R1[mm] of the corner 6 having an arc shape of the cell 2 and the thickness T1[mm] of the partition wall 1 satisfy the relationship of the following equation (1). With this configuration, the honeycomb structure 100 has high isostatic strength and capable of achieving pressure loss reduction even when the outer diameter is large. For example, the honeycomb structure 100 can be effectively suppressed from increasing in pressure loss while effectively suppressing the occurrence of cell twisting due to the thinning of the partition wall 1 of the honeycomb structure 100. For example, when the "R1×T1" in Equation (1) is less than 0.0050, the isostatic strength of the honeycomb structure 100 decreases. On the other hand, when the "R1×T1" in Equation (1) exceeds 0.0150, the pressure loss of the honeycomb structure 100 increases.

$$0.0050 \leq R1 \times T1 \leq 0.0150 \qquad \text{Equation (1):}$$

The radius of curvature R1[mm] of the corner 6 having an arc shape of the cell 2 can be measured by the following methods. First, a section orthogonal to the extending direction of the cell 2 of the honeycomb structure 100 is photographed, and a part having a curvature constituting the corner 6 having an arc shape is confirmed from the photographed sectional image of the honeycomb structure 100. Specifically, two points at each end of the corner 6 having an arc shape are found as follows. One point corresponding to the boundary between the corner 6 having an arc shape and one straight side constituting the main outer shape of the substantially polygonal cell 2 is defined as one end of the corner 6 having an arc shape. A point corresponding to a boundary between the corner 6 having an arc shape and another straight side constituting the main outer shape of the substantially polygonal cell 2 is defined as the other end of the corner 6 having an arc shape. After finding the two points to be the respective ends of the corner 6 having an arc shape in this way, on the curved part of the corner 6 having an arc shape, an intermediate point is found that is equidistant from the two points of the one end and the other end as described above. The radius of the circle tangent to the three points of one end, the intermediate point, and the other end of the corner 6 having an arc shape is the radius of curvature R1 of the corner 6 having an arc shape. The radius of curvature R1[mm] of the corner 6 is measured by an optical microscope.

The specific value of the radius of curvature R1[mm] of the corner 6 having an arc shape of the cell 2 is not particularly limited as long as the thickness T1[mm] of the partition wall 1 is 0.0500 to 0.1400 mm and satisfies the above equation (1). For example, the radius of curvature R1[mm] of the corner 6 having an arc shape of the cell 2 is preferably 0.0700 to 0.1500 mm and more preferably 0.0700 to 0.1200 mm.

In the honeycomb structure 100 of the present embodiment, in a section orthogonal to the extending direction of the cell 2 of the honeycomb structure body 4, the outer diameter D1[mm] of the honeycomb structure body 4 is 190.5 to 355.6 mm and preferably 190.5 to 266.7 mm. In particular, when the honeycomb structure 100 has a relatively large outer diameter D1[mm] of the honeycomb structure body 4 as described above, it is possible to extremely effectively suppress the occurrence of cell twisting due to the thinning of the partition wall 1 of the honeycomb structure 100. If the outer diameter D1[mm] of the honeycomb structure body 4 is less than 190.5 mm, pressure loss of the honeycomb structure 100 increases. If the outer diameter D1[mm] of the honeycomb structure body 4 exceeds 355.6 mm, damage or deformation is likely to occur during handling, which is not preferable in that the isostatic strength is reduced.

In the honeycomb structure 100, the porosity of the partition wall 1 of the honeycomb structure body 4 is 20 to 40%, and preferably 30 to 35%. If the porosity of the partition wall 1 is too low, it is not preferable in that the catalyst tends to peel off when used as an exhaust gas purification device. If the porosity of the partition wall 1 is too high, the strength of the honeycomb structure body 4 may be insufficient, and it may be difficult to hold the honeycomb structure 100 with enough gripping force when the honeycomb structure 100 is housed in the can body used for the exhaust gas purification device. The porosity of the partition wall 1 shall be the value measured by a mercury porosimeter. Examples of the mercury porosimeter include Autopore 9500 (trade name) manufactured by Micromeritics Instrument Corporation.

In the honeycomb structure 100, the cell density of the honeycomb structure body 4 is preferably 30 to 140 cells/cm$^2$, more preferably 31 to 93 cells/cm$^2$. With this configuration, it can be suitably used as a filter for trapping PM in exhaust gas emitted from engines of automobiles. If the cell density is too small, the isostatic strength may decrease, and if the cell density is too large, pressure loss may increase.

The material of the partition wall 1 is not particularly limited. Examples of the material of the partition wall 1 include ceramics. In particular, the partition wall 1 preferably contains silicon carbide, silicon-bonded silicon carbide, a bonding material sintered ceramic material, mullite, cordierite, or aluminium titanate. The "silicon-bonded silicon carbide" means, for example, silicon carbide particles as aggregate bonded by metallic silicon. In addition, the "bonding material sintered ceramic material" means, for example, a ceramic material made by sintering, in which aggregates such as silicon carbide and mullite are bonded together by a bonding material such as cordierite.

The entire shape of the honeycomb structure 100 is not particularly limited. The entire shape of the honeycomb structure 100 is preferably circular or oval, in particular circular, in the shape of the first end face 11 and the second end face 12. The size of the honeycomb structure 100, for example, the length from the first end face 11 to the second end face 12 of the honeycomb structure body 4, is not particularly limited. It may be appropriately selected so as to obtain optimum purification performance when the honeycomb structure 100 is used as an exhaust gas purifying member such as a catalyst carrier for loading a catalyst for purifying exhaust gas.

Next, a method for manufacturing the honeycomb structure of the present embodiment will be described. However, the method for manufacturing the honeycomb structure is not limited to the manufacturing method described below.

First, a plastic kneaded material for making a honeycomb structure body is prepared. The kneaded material for making honeycomb structure body can be prepared by adding an additive such as a binder and water as appropriate to a material selected from the above-mentioned suitable material group of the partition wall as a raw material powder.

Next, the prepared kneaded material is subjected to extrusion so as to obtain a pillar-shaped honeycomb formed body having a partition wall defining a plurality of cells and a circumferential wall disposed on outermost circumference. In the extrusion, a die in which a slit having an inverted shape of the honeycomb formed body to be formed is formed on the extruded surface of the kneaded material can be used as the die for the extrusion. For example, extrusion using a die corresponding to a desired cell shape, partition wall thickness, or the like can be exemplified as a preferable example. For example, the cell shape in the die may be a polygonal shape (for example, a substantially quadrangular shape in FIG. 3) having a corner 6 having an arc shape (for example, see FIG. 3) described so far. The material of die is preferably cemented carbide which is hardly worn. The obtained honeycomb formed body may be dried by microwaves and hot air, for example.

Next, the obtained honeycomb formed body is calcined to obtain a honeycomb structure. The firing temperature and the firing atmosphere differ according to the raw material, and those skilled in the art can select the firing temperature and the firing atmosphere that are the most suitable for the selected material.

EXAMPLES

The following will describe in more detail the present invention by examples, but the present invention is not at all limited by these examples.

Example 1

To 100 parts by mass of cordierite forming raw material, 2.2 parts by mass of pore former, 1.1 parts by mass of dispersing medium, and 8.0 parts by mass of an organic binder were added, respectively, and mixed and kneaded to prepare a kneaded material. As the cordierite forming raw material, alumina, aluminum hydroxide, kaolin, talc, and silica were used. As the dispersing medium, water was used. As the organic binder, methylcellulose was used. As the dispersing agent, dextrin was used. As the pore former, a polyacrylic acid-based polymer having an average particle diameter of 30 μm, a starch, a polymer compound such as foamable resin and polymethyl methacrylate (PMMA) resin, and coke (carbon fuel) were used.

Next, the kneaded material was extruded using a die for making a honeycomb formed body to obtain a honeycomb formed body having a round pillar shape as the entire shape. The cell shape of the honeycomb formed body was a quadrangular shape having a corner 6 having an arc shape with a radius of curvature R1.

Next, the honeycomb formed body was dried with a microwave dryer, and then was dried completely with a hot-air drier, and then both end faces of the honeycomb formed body were cut so as to have a predetermined dimension.

The dried honeycomb formed body was then degreased and calcined to manufacture the honeycomb structure of Example 1.

The honeycomb structure of Example 1 had a round pillar shape, where the shapes of the first end face and the second end face were round. The outer diameter D1[mm] of the first end face and the of the second end face of the honeycomb structure was 266.7 mm. In addition, the total length [mm] in the extending direction of the cells of the honeycomb structure was 152.4 mm. Table 1 shows the results.

In the honeycomb structure of Example 1, the thickness T1 of the partition wall was 0.0635 mm. Table 1 shows the results. In addition, in the honeycomb structure of Example 1, the cell density was 93 cells/cm$^2$ and the porosity of the partition wall was 34%. The porosity of the partition wall was measured using Autopore 9500 (trade name) manufactured by Micromeritics Instrument Corporation.

The cell shape in the honeycomb structure of Example 1 was a substantially quadrangular shape with a corner having an arc shape. A radius of curvature R1 of the corner having an arc shape of the substantially quadrangular-shaped cell was measured and found to be 0.1000 mm. Table 1 shows the results. The radius of curvature R1 is measured as follows.

[Measurement of Radius of Curvature R1]

In the optical microscope, two points of one end and the other end of the corner having an arc shape were found, and further, on the curved part of the corner having an a arc shape, an intermediate point equidistant from the two points of the one end and the other end described above was found. Then, the inscribed circle tangent to the three points of one end, the intermediate point, and the other end of the corner having an arc shape was virtually drawn, the radius of the inscribed circle was defined to the radius of curvature R1 of the corner having an arc-shape.

TABLE 1

| | Honeycomb structure body | | Thickness | Radius of | | | | |
|---|---|---|---|---|---|---|---|---|
| | Outer diameter D1 [mm] | Overall length [mm] | T1 of partition wall[mm] | curvature R1 of corner [mm] | R1 × T1 | Porosity [%] | Pressure loss | Isostatic Strength |
| Comparative Example 1 | 266.7 | 152.4 | 0.0635 | 0.0500 | 0.0032 | 35 | OK | NG |
| Comparative Example 2 | 266.7 | 152.4 | 0.0635 | 0.0700 | 0.0044 | 34 | OK | NG |
| Example 1 | 266.7 | 152.4 | 0.0635 | 0.1000 | 0.0064 | 34 | OK | OK |
| Example 2 | 266.7 | 152.4 | 0.0635 | 0.1200 | 0.0076 | 25 | OK | OK |
| Comparative Example 3 | 266.7 | 152.4 | 0.0762 | 0.0500 | 0.0038 | 26 | OK | NG |
| Example 3 | 266.7 | 152.4 | 0.0762 | 0.0700 | 0.0053 | 39 | OK | OK |
| Example 4 | 266.7 | 152.4 | 0.0762 | 0.1000 | 0.0076 | 40 | OK | OK |
| Example 5 | 266.7 | 152.4 | 0.0762 | 0.1200 | 0.0091 | 21 | OK | OK |
| Comparative Example 4 | 266.7 | 152.4 | 0.0889 | 0.0500 | 0.0044 | 34 | OK | NG |
| Example 6 | 266.7 | 152.4 | 0.0889 | 0.0700 | 0.0062 | 35 | OK | OK |
| Example 7 | 266.7 | 152.4 | 0.0889 | 0.1000 | 0.0089 | 22 | OK | OK |
| Example 8 | 266.7 | 152.4 | 0.0889 | 0.1200 | 0.0107 | 26 | OK | OK |
| Comparative Example 5 | 266.7 | 152.4 | 0.0254 | 0.2000 | 0.0051 | 33 | OK | NG |
| Comparative Example 6 | 266.7 | 152.4 | 0.1524 | 0.0500 | 0.0076 | 34 | NG | OK |
| Comparative Example 7 | 266.7 | 152.4 | 0.1143 | 0.1500 | 0.0171 | 38 | NG | OK |
| Comparative Example 8 | 266.7 | 152.4 | 0.1016 | 0.1700 | 0.0173 | 39 | NG | OK |
| Comparative Example 9 | 152.4 | 152.4 | 0.0635 | 0.0700 | 0.0044 | 23 | NG | OK |
| Comparative Example 10 | 266.7 | 152.4 | 0.0635 | 0.1200 | 0.0076 | 50 | OK | NG |
| Comparative Example 11 | 152.4 | 152.4 | 0.0762 | 0.1000 | 0.0076 | 33 | NG | OK |

The honeycomb structure of Example 1 was evaluated for "pressure loss" and "isostatic strength" in the following manner. Table 1 shows the results.

[Pressure Loss]

Air with a constant flow rate of 20 $m^3$/min was passed through the honeycomb structure at normal temperature, and the differential pressure between front and rear of the honeycomb structure was measured with a differential pressure gauge, and pressure loss (kPa) of the honeycomb structures of each Example and Comparative example were measured. The honeycomb structures of each Example and Comparative example were evaluated based on the following evaluation criteria.

Evaluation "OK": When it is less than 0.7 kPa, it is evaluated as "OK (passed)".

Evaluation "NG": When it is 0.7 kPa or more, it is evaluated as "NG (failed)".

[Isostatic Strength]

The isostatic strength (MPa) of the honeycomb structures of each Example and Comparative example were measured according to a measuring method of isostatic breaking strength specified in JASO standard M505-87, which is an automotive standard issued by Society of Automotive Engineers of Japan, Inc. The honeycomb structures of each Example and Comparative example were evaluated based on the following evaluation criteria.

Evaluation "OK": When the isostatic breaking strength is 1.0 MPa or more, it is evaluated as "OK (passed)".

Evaluation "NG": When the isostatic breaking strength is less than 1.0 MPa, it is evaluated to as "NG (failed)".

Examples 2 to 8

The honeycomb structures were prepared in the same manner as the honeycomb structure of Example 1 except that the configuration of the honeycomb structure was changed as shown in Table 1.

Comparative Examples 1 to 11

The honeycomb structures were prepared in the same manner as the honeycomb structure of Example 1 except that the configuration of the honeycomb structure was changed as shown in Table 1.

Results

The honeycomb structures of Examples 1 to 8 were successfully evaluated for both "pressure loss" and "isostatic strength". In particular, the honeycomb structures of Examples 1 to 8 had an outer diameter D1 of the honeycomb structure body as large as 266.7 mm, but the partition walls were hardly distorted at the time of manufacturing, and the cell twisting that adversely affected the isostatic strength did not occur. Therefore, the honeycomb structures of Examples 1 to 8 were excellent in isostatic strength.

On the other hand, the honeycomb structures of Comparative Examples 1 to 4 in which the value of "R1×T1" was less than 0.0050 failed the evaluation of "isostatic strength". The honeycomb structures of Comparative Examples 7 and 8 in which the value of "R1×T1" was greater than 0.0150 passed the evaluation of "isostatic strength", but failed the evaluation of "pressure loss".

Comparative Example 5 in which the thickness T1 of the partition wall was 0.0254 mm failed the evaluation of "isostatic strength". In addition, Comparative Example 6 in which the thickness T1 of the partition wall was 0.1524 mm failed the evaluation of "pressure loss". In Comparative Example 9 and Comparative Example 11 in which the outer diameter D1 was lower than 190.5 mm, pressure loss was inferior to that in Examples 1 to 8. In both Comparative Example 9 and Comparative Example 11, the evaluation of isostatic strength satisfied the passing criteria. Here, in Comparative Example 9, the value of R1×T1 is less than 0.0050, and in Comparative Example 11, the value of R1×T1 satisfies the range of 0.0050 to 0.0150. The values of R1×T1 of both are consistent with the values of both Comparative example 2 and Example 2. In the comparison between Comparative Example 2 and Example 2, Comparative Example 2 in which the value of R1×T1 is less than 0.0050 failed the isostatic strength. In Comparative Example 2, since the outer diameter is as large as 266.7 mm, it is considered that deformation due to its own weight occurred in the forming process, and the isostatic strength was greatly reduced. In the honeycomb structure of Comparative Example 10, since the porosity of the partition wall was 50%, the evaluation of the "isostatic strength" failed. In the honeycomb structure of Comparative Example 11, since the outer diameter D1 was 152.4 mm, the evaluation of "pressure loss" failed.

INDUSTRIAL APPLICABILITY

The honeycomb structure of the present invention can be used as a catalyst carrier for loading a catalyst for purifying exhaust gas.

DESCRIPTION OF REFERENCE NUMERALS

1: partition wall, 2: cell, 3: circumferential wall, 4: honeycomb structure body, 11: first end face, 12: second end face, D1: outer diameter (outer diameter of the honeycomb structure body), R1: radius of curvature, T1: thickness (thickness of the partition wall), and 100: honeycomb structure.

The invention claimed is:

1. A honeycomb structure comprising: a pillar-shaped honeycomb structure body having a plurality of porous partition walls that define and surround a plurality of cells which serve as fluid through channels extending from a first end face to a second end face; and a circumferential wall disposed so as to encompass the plurality of porous partition walls, wherein the honeycomb structure is made of cordierite, the first end face and the second end face of the honeycomb structure body have a circular or oval shape, the circumferential wall of the honeycomb structure body has a shape of a cylinder that extends between a circumference of the first end face and a circumference of the second end face, the honeycomb structure body has a cell density that is uniform over the entire first end face and the entire second end face, in a section orthogonal to the extending direction of the cells of the honeycomb structure body, the shape of the cell is a quadrangular shape with a corner having an arc shape, a thickness T1 (mm) of the plurality of porous partition walls is 0.0635 to 0.0889 mm, a radius of curvature R1 (mm) of the corner having the arc shape of the cell is 0.07 to 0.12 mm, the radius of curvature R1 (mm) of the corner and the thickness T1 (mm) of the plurality of porous partition walls satisfy the relationship of Equation (1), in the section orthogonal to the extending direction of the cells of the honeycomb structure body, the outer diameter of the honeycomb structure body is 190.5 to 355.6 mm, a porosity of the plurality of porous partition walls is 20 to 40%, $$0.0050 \leq R1 \times T1 \leq 0.0150 \qquad \text{Equation (1),}$$

the honeycomb structure has an isostatic strength of 1.0 MPa or more, and the honeycomb structure exhibits a pressure loss of less than 0.7 kPa, where the pressure loss is measured by passing air with a constant flow rate of 20 $m^3$/min through the honeycomb structure at normal temperature and measuring a differential pressure between the first end face and the second end face with a differential pressure gauge.

2. The honeycomb structure according to claim 1, wherein the cell density of the honeycomb structure body is 30 to 140 cells/$cm^2$.

* * * * *